(12) United States Patent
Ryshavy et al.

(10) Patent No.: US 8,317,211 B1
(45) Date of Patent: Nov. 27, 2012

(54) AUTOMOTIVE SUSPENSION ADJUSTMENT APPARATUS

(75) Inventors: John W. Ryshavy, Wayzata, MN (US); Shawn Christopher Miller, Milaca, MN (US); James R. Ryshavy, Eden Prairie, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 0 days.

(21) Appl. No.: 13/222,771

(22) Filed: Aug. 31, 2011

(51) Int. Cl.
*B60G 11/00* (2006.01)
(52) U.S. Cl. .............................. 280/124.175
(58) Field of Classification Search ........... 280/124.175, 280/124.174, 124.17
See application file for complete search history.

(56) References Cited

U.S. PATENT DOCUMENTS

| | | | |
|---|---|---|---|
| 5,467,971 A | 11/1995 | Hurtubise et al. | |
| 5,470,049 A | 11/1995 | Wohler et al. | |
| 5,788,262 A | 8/1998 | Dazy et al. | |
| 6,257,601 B1 | 7/2001 | Speaers et al. | |
| 6,273,407 B1 | 8/2001 | Germano | |
| 6,485,223 B1 | 11/2002 | Van Schmus et al. | |
| 6,820,883 B2 | 11/2004 | Lang et al. | |
| 7,066,309 B2 | 6/2006 | Colas et al. | |
| 7,311,181 B2 | 12/2007 | Germano et al. | |
| 7,537,225 B2 | 5/2009 | Ryshavy et al. | |
| 7,607,668 B2 | 10/2009 | Dugandic et al. | |
| 7,780,178 B2 | 8/2010 | Ryshavy et al. | |
| 7,850,183 B1 | 12/2010 | Ryshavy et al. | |
| 7,976,039 B2 | 7/2011 | Hirve et al. | |
| 8,109,492 B2 | 2/2012 | Winocur | |
| 2004/0155424 A1* | 8/2004 | Hicks et al. | 280/124.17 |
| 2005/0017475 A1* | 1/2005 | Hellums | 280/124.17 |
| 2007/0187919 A1* | 8/2007 | Furman | 280/124.175 |
| 2012/0098215 A1 | 4/2012 | Rositch et al. | |

* cited by examiner

*Primary Examiner* — Faye M. Fleming
(74) *Attorney, Agent, or Firm* — Haugen Law Firm PLLP

(57) ABSTRACT

A vehicle suspension lift kit includes a first suspension lift component having a first interlocking pattern, and a second suspension lift component having a second interlocking pattern. The first and second interlocking patterns are selectively matingly engagable with one another to prevent relative motion among the first and second components along an interfacial plane. Each of the first and second suspension lift components are specifically configured to be employed individually or in combination between a vehicular leaf spring suspension and a vehicular axle housing to provide a selected extent of suspension lift.

6 Claims, 11 Drawing Sheets

AUTOMOTIVE SUSPENSION ADJUSTMENT APPARATUS

FIELD OF THE INVENTION

The present invention relates to automotive suspension systems generally, and more particularly to apparatus and methods for adjusting automotive suspension height, specifically at an interface between a leaf spring suspension and a corresponding axle housing.

BACKGROUND OF THE INVENTION

Automotive suspension systems in use today incorporate a variety of arrangements to best suit the intended applications. A well known automotive suspension apparatus currently used primarily in truck suspensions is a system utilizing leaf springs. The system is designed to allow semi-independent movement of the axle housing assembly and the vehicle frame.

In some instances, vehicle owners wish to modify the height of the vehicle frame with respect to the vehicle wheels. For example, owners may wish to increase the height of a vehicle frame for increased wheel clearance or aesthetic purposes.

Devices for effectuating such suspension height modification include static spacers of fixed dimension that are typically placed between the top of the axle housing and the leaf spring suspension. The extent of the suspension height increase is predetermined by the dimension of the static spacer utilized. In many instances, the effect on vehicle ride quality due to suspension height extension is unpredictable. As a result, suspension height modifications are many times repeated in order to achieve a desired balance between suspension height and vehicle ride quality. As a result, a need exists in the art for a suspension height adjustment apparatus that enables a range of suspension height modifications.

It is therefore an objective of the present invention to provide a suspension adjustment apparatus that facilitates a range of suspension height modifications in a simple and inexpensive device.

BRIEF DESCRIPTION OF DRAWINGS

Like reference symbols in the various drawings indicate like elements.

DETAILED DESCRIPTION OF THE PREFERRED EMBODIMENTS

The terms "top", "bottom", and "sides" are used in the specification to describe the embodiment of the invention as illustrated in the figures. It should be appreciated that in actual use, an embodiment of the invention may be rotated as needed to accomplish the aims of the invention. As a result of such rotation, the orientated terms used herein may not literally apply to a particular arrangement. In other words, the various terms of "top", "bottom", "base" and the like are relative and are used here to describe the figures for illustration purposes and are not intended to limit the embodiments shown to any particular orientation.

The present invention is directed to a multi-unit vehicle suspension lift system designed to provide a range of suspension height modifications by selecting among one or more lift elements individually or in combination to effectuate a variety of suspension lift heights. For example, the lift kit of the present invention may possess two static lift components. A first lift component of the lift kit may possess a first lift height. A second lift component of the lift kit may possess a second lift height that is different that the first lift height. The first and second lift components may be utilized individually, or in combination in a locked-together configuration, to effectuate a suspension height modification. Therefore, a user may select among a plurality of available arrangements to achieve a desired extent of suspension lift.

Figure 1:
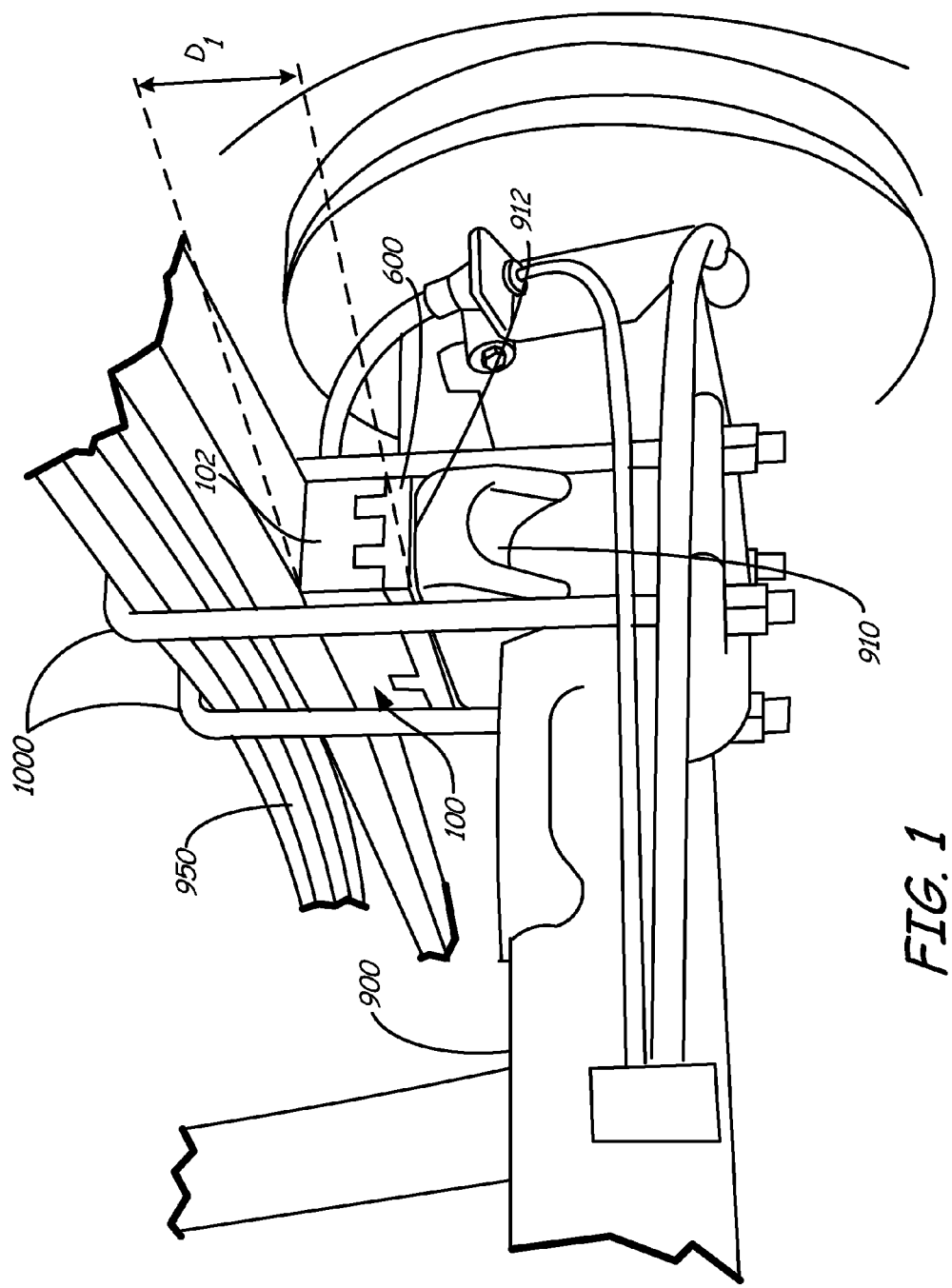
FIG. 1 is a schematic illustration of a suspension lift kit in position between a vehicle leaf spring suspension and a vehicle wheel axle housing.

A suspension adjustment apparatus is illustrated in FIG. 1, wherein suspension lift kit 100 is mounted between a leaf spring suspension 950 and a vehicular axle housing 900 to adjust a distance between axle housing 900 and leaf spring suspension 950. In particular, suspension lift kit 100 acts as a spacer with a plurality of configurations to allow the user to select a desired suspension lift dimension provided by one or more components of suspension lift kit 100. Lift dimension "$D_1$" is therefore defined by a height dimension "$H_1$" of the utilized components of suspension lift kit 100. In the embodiment illustrated in FIG. 1, first and second suspension lift components 102, 600 are utilized in combination as suspension lift kit 100 to define lift kit height "$H_1$", and correspondingly the lift dimension "$D_1$" of the spacing lift of leaf spring suspension 950 with respect to axle housing 900. In one embodiment, therefore, suspension lift kit 900 includes first and second suspension lift components 102, 600 that may be used individually or in combination to define a desired lift dimension "$D_1$" between leaf spring suspension 950 and axle housing 900.

Leaf spring suspensions, such as leaf spring suspension 950 illustrated in the drawings, are typically secured between a vehicular axle assembly and the vehicle frame to interface and dampen movement between the axle assembly and the frame. The movement dampening/isolation performed by the leaf spring suspension reduces undesired movement of the vehicle cab as the axle assembly, which may be directly secured to the vehicle wheels, are exposed to substantially direct response from roadway undulations. In typical arrangements, a leaf spring mounting bracket 910 is employed in combination with axle housing 900, wherein leaf spring mounting bracket 910 may be welded or otherwise secured to axle housing 900 to establish a mounting surface 912 to which leaf spring suspension 950 may be operably secured in a conventional arrangement. In at least one embodiment of the present invention, suspension lift kit 100 may be secured to mounting surface 912 of leaf spring mounting bracket 910 so as to be interposed between leaf spring mounting bracket 910 and leaf spring suspension 950. It may therefore be useful to provide suspension lift kit 100 with engagement mechanisms or elements facilitating securement between leaf spring suspension 950 and mounting bracket 910. An exploded view of the embodiment in FIG. 1 is provided in FIG. 2. As revealed in the exploded view of FIG. 2, a common approach for aligning securement of leaf spring suspension 950 to leaf spring mounting bracket 910 is an engagement protrusion in one of leaf spring suspension 950 and leaf spring mounting bracket 910 operably engaging with a cooperating recess in the other of leaf spring suspension 950 and mounting bracket 910. Most typically, an engaging protrusion, in the form of leaf spring guide post 960 extends from a lower surface of leaf spring suspension 950 in order to operably engage within a corresponding recess 920 (not shown) in mounting surface 912 of leaf spring mounting bracket 910. To aid in the securement and alignment of suspension lift kit 100 between leaf spring suspension 950 and leaf spring mounting bracket 910, an engaging protrusion in the form of a positioning guide post 640 may extend from a lower surface 602 of second suspension lift component 600 to cooperatively engage with axle mounting bracket recess 920 in axle mounting bracket 910. Therefore, positioning guide post 640 may be configured to operably engage within recess 920 for alignment and securement purposes. In like manner, first suspension lift component 102 may be provided with a locating recess 151 in upper surface 150 to operably receive leaf spring guide post 960 therein for guiding and securement purposes. Suspension lift kit 100 may be secured in place between leaf spring suspension 950 and leaf spring mounting bracket 910 with the use of, for example, U-bolts 1000 with securing nuts 1010.

Figure 3:
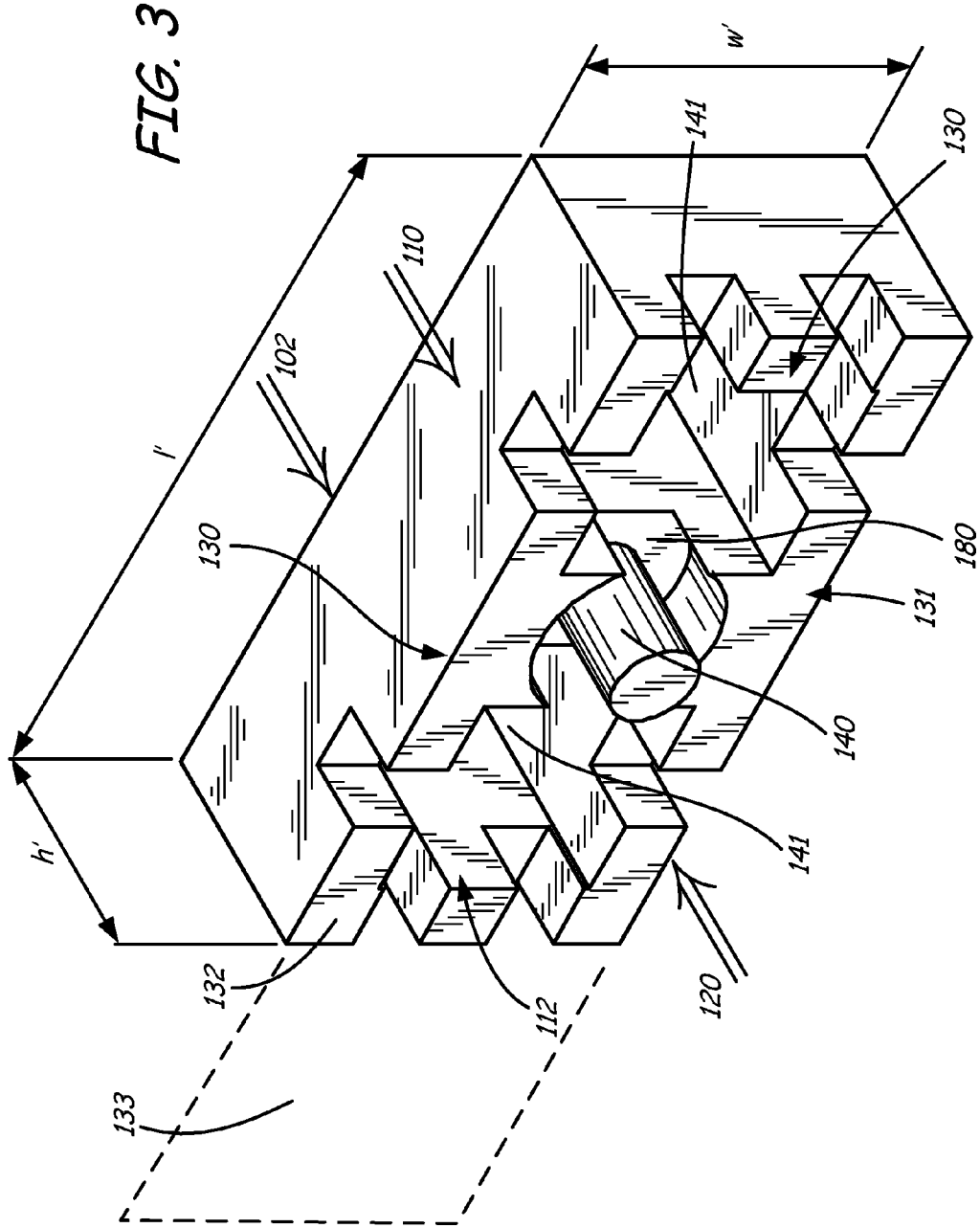
FIG. 3 is a bottom perspective view of an exemplar embodiment of a first component of the suspension lift kit illustrated in FIG. 1.

Referring to FIG. 3, a first exemplar suspension lift component 102 comprises a first body 110. The first exemplar suspension lift component body 110 is generally parallelpiped in shape with height "h'", width "w'", and length "l'" dimensions. The invention, however, anticipates any geometric shape for body 110 that satisfies the functional characteristics described herein. Such shapes may include, but are not limited to, a cube, a cylinder, a truncated square pyramid, a truncated right pyramid, and the like.

The first body 110 comprises a positive interlock bottom side 120 including a first interlocking pattern 112 of first recesses 141 and first protrusions 130 of various shapes and sizes distributed throughout at least a portion of the bottom side 120. It should be appreciated that while a specific number and shape of first recesses 141 and first protrusions 130 are illustrated, any pattern useful as described below may be employed.

Illustrated first interlocking pattern 112 includes first protrusions 130 with substantially flat bottom surfaces 131, at least some of which are aligned with one another along a bottom surface plane 133. In the exemplar embodiment, the first protrusions 130 have height and width dimensions of 0.5 inch by 0.375 inch, and a variety of lengths ranging from 0.0438 inch to 2.25 inches, with the "height", "width", and "length" dimensions being measured in the convention designated by height h', width w', and length l' of body 110. Such dimensions are only described to provide context, and are not intended to limit the possible range of sizes for first protrusions 130. The invention anticipates first protrusions 130 of any suitable height, width, and length dimensions that satisfy the performance characteristics of body 110, including as an individually employed suspension lift component between leaf spring suspension 950 and axle housing mounting bracket 910, wherein first body 110, and its protrusions 130, desirably meet the structural requirements for a vehicle suspension system. First protrusions 130 themselves may be provided in any of a variety of configurations useful both for supporting body 110 in interposition between leaf spring suspension 950 and axle housing mounting bracket 910, as well as for interlocking with coordinating recesses in second suspension lift component 600. Therefore, first protrusions 130 may be, for example, pyramidal, truncated pyramidal, cylindrical, and the like, and may not be all aligned along bottom surface plane 133. In one embodiment, bottom surfaces 131 of first protrusions 130 collectively define a first platform 132 along bottom surface plane 133 that is of sufficient surface area to support first body 110 in operation as a spacer between leaf spring suspension 950 and axle housing mounting bracket 910. In one embodiment, platform 132 may be required to stably support a significant degree of force without operationally detrimental deformation or failure. Such force may be generated as a result of a substantial portion of a vehicle weight being placed upon the interface between leaf spring suspension 950 and axle housing 900. As a result, first body 110 is typically manufactured from a strong and rigid material, and is configured with a first platform 132 of sufficient surface area to support the pressures described above without operationally detrimental deformation or failure of first body 110.

In one embodiment, first platform 132 of first body 110 assumes a total surface area along bottom surface plane 133 of about 5 in$^2$, which represents about 40% of a total possible surface area along bottom surface plane 133. It has been determined by the Applicant that first platform 132 may preferably have a total surface area of at least about 25% of the total possible surface area along bottom surface plane 133, and more preferably at least about 40% thereof.

Figure 6:
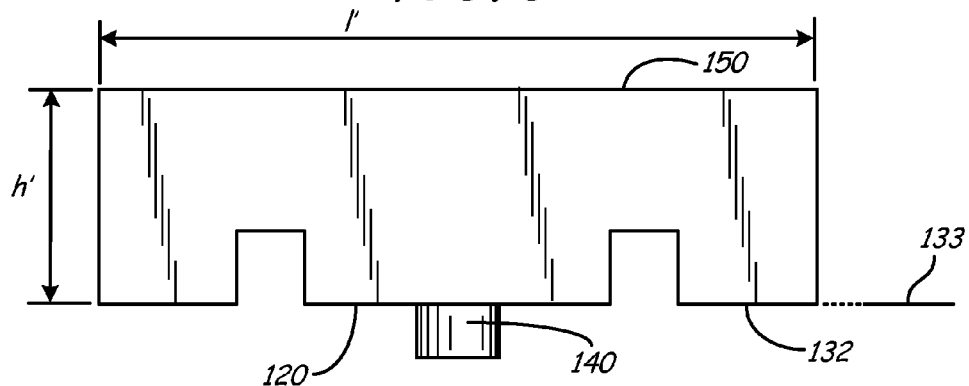
FIG. 6 is a side elevational view of the component illustrated in FIGS. 3-5.
Figure 7:
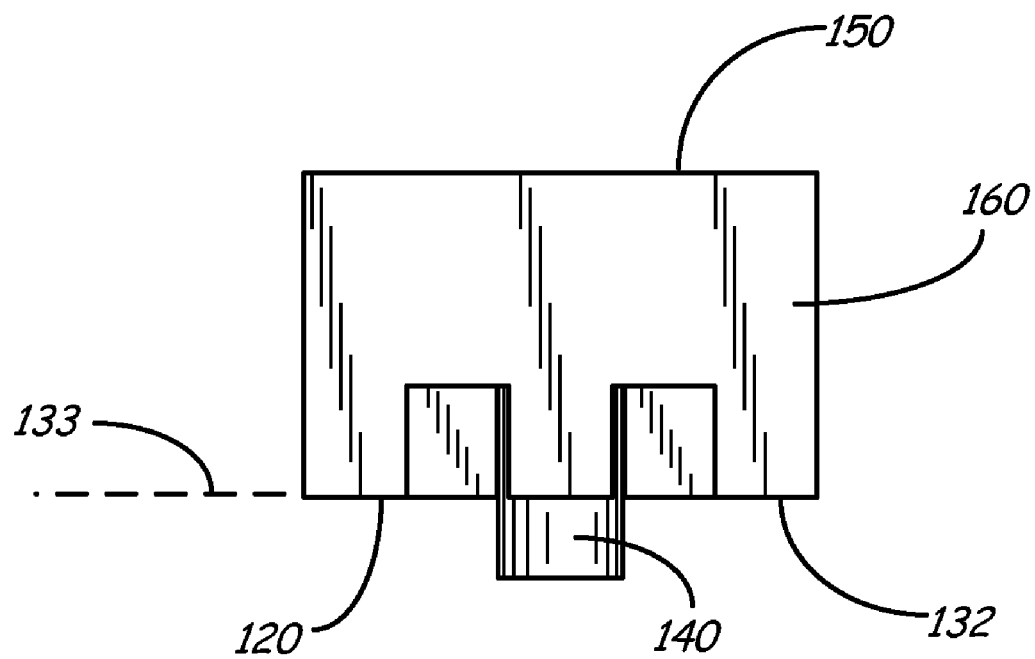
FIG. 7 is an end elevational view of the component illustrated in FIGS. 3-6.
Figure 8:
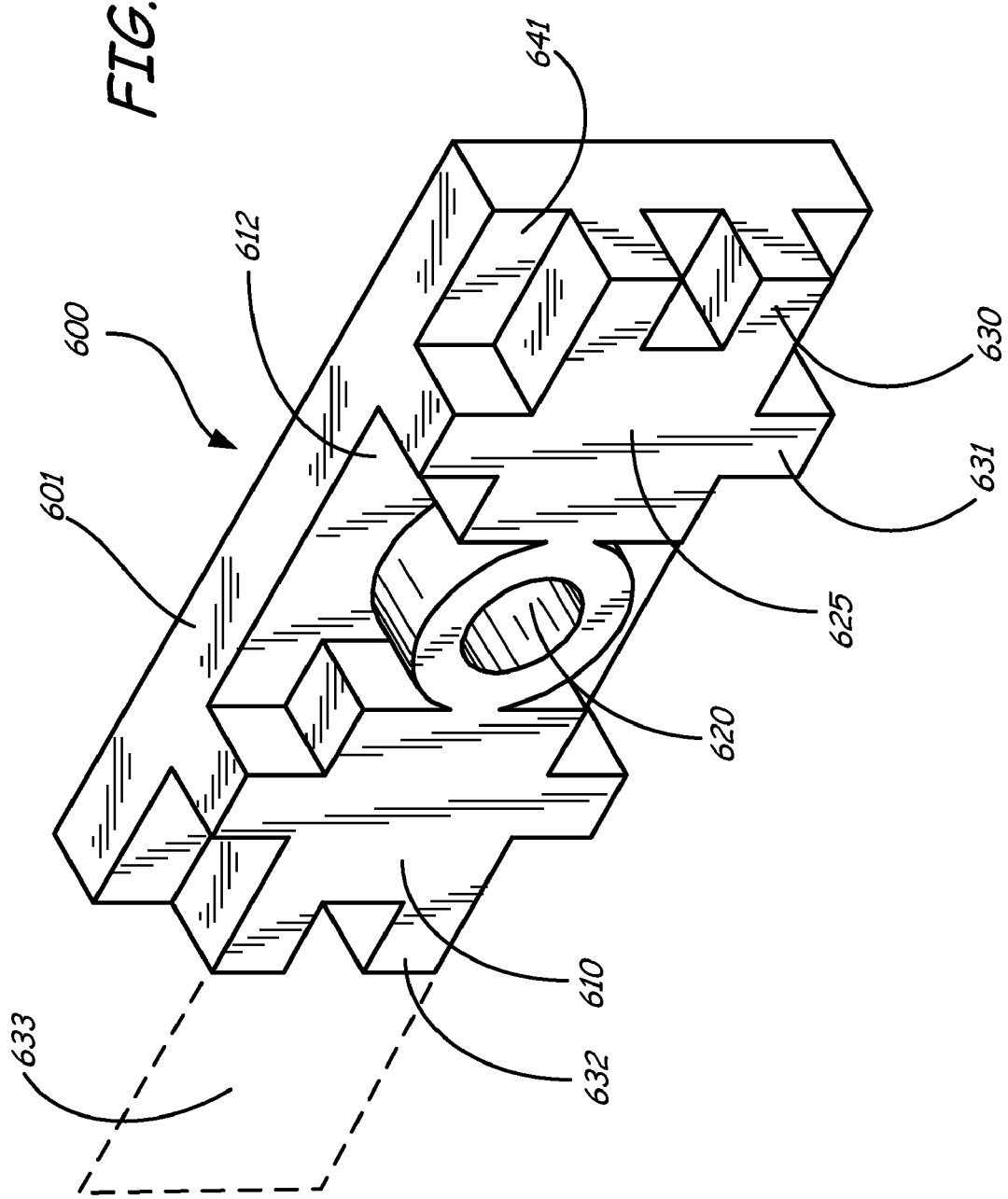
FIG. 8 is a top perspective view of an exemplar embodiment of a second component of the suspension lift kit illustrated in FIG. 1.
Figure 9:
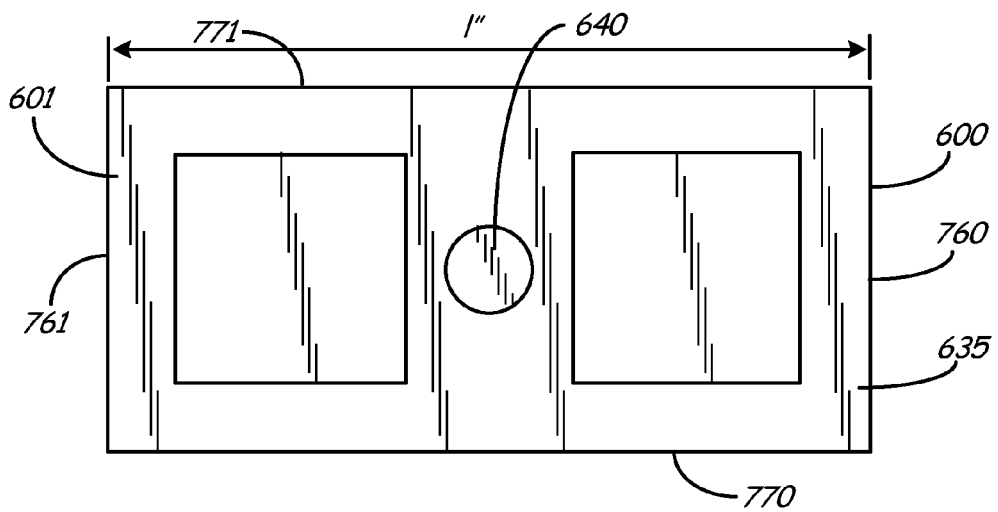
FIG. 9 is a bottom plan view of the component illustrated in FIG. 8.
Figure 10:
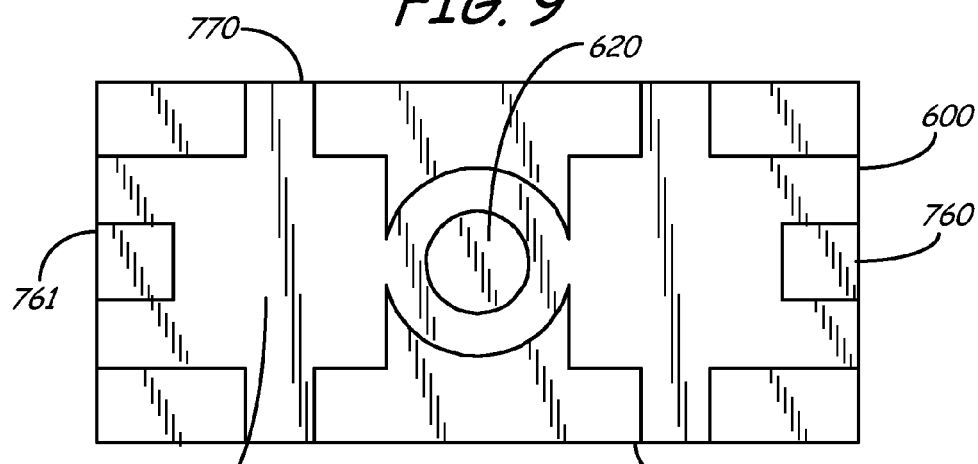
FIG. 10 is a top plan view of the component illustrated in FIGS. 8 and 9.
Figure 11:
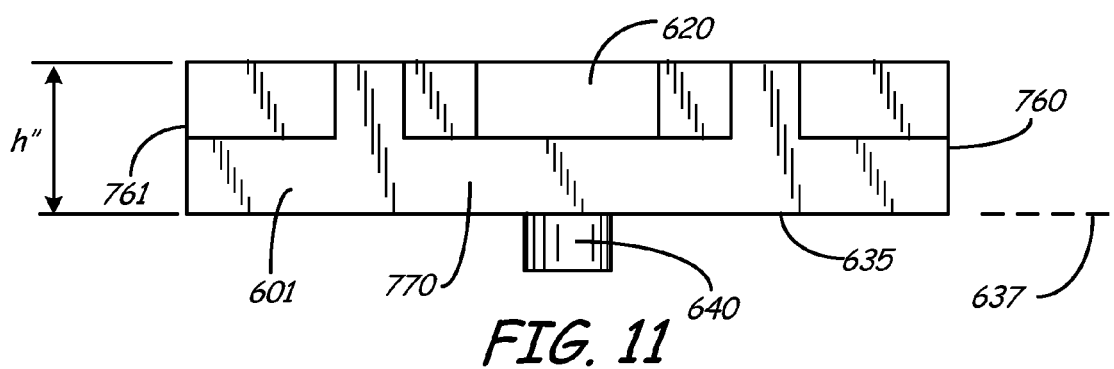
FIG. 11 is a side elevational view of the component illustrated in FIGS. 8-10.
Figure 12:
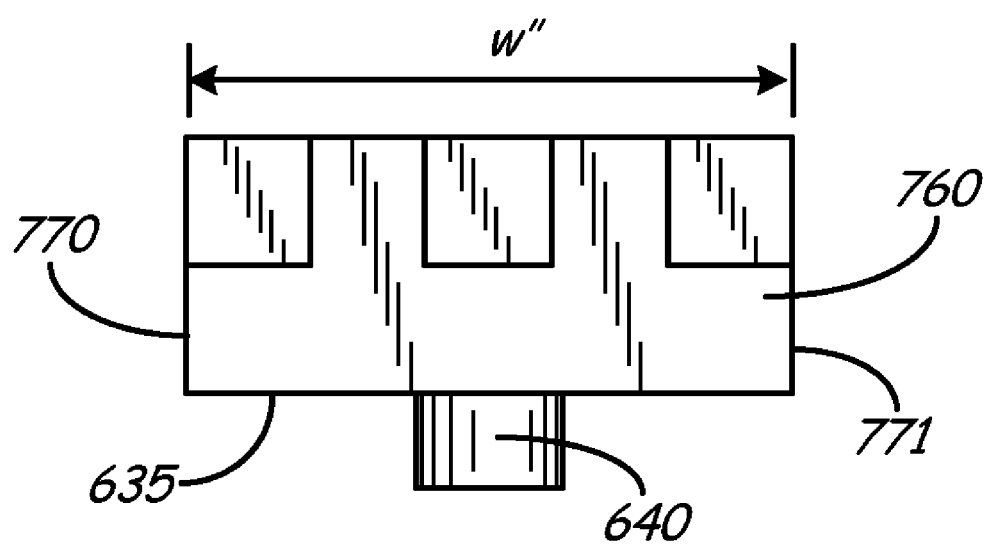
FIG. 12 is an end elevational view of the component illustrated in FIGS. 8-11.

Interlocking bottom side 120 further comprises a first positioning guide post 140. The first positioning guide post 140 may extend downward and beyond the bottom surface plane 133 (see FIGS. 6 and 7), so as to define an engaging protrusion for operably engaging within recess 920 of leaf spring mounting bracket 910, or within recess 620 of second suspension lift component 600. In some embodiments, positioning guidepost 140 may be substantially cylindrical with a cross-sectional diameter of about 0.5 in, and extending downwardly beyond bottom surface plane 133 by about 0.5 in. It is to be understood, however, that first body 110 is not limited to the illustrated configuration of positioning guide post 140, and is also not limited to only a single engaging protrusion for engaging a selective one of leaf spring mounting bracket 910 or second suspension lift component 600.

First lift component body 110 also comprises a top side 150 (shown in FIGS. 4 and 5), which includes a recess 151 for operably receiving leaf spring positioning guide post 960, located on, and in association with, a vehicle leaf spring suspension 950. As described above, leaf spring guide post 960 may connect with first lift component body 110 by engaging within recess 151 to align leaf spring suspension 950 with first body 110, and to inhibit undesired displacement of the first body 110 when the assembly is complete. Recess 151 is therefore preferably configured to matingly engage with guide post 960.

The first lift component body 110 also comprises two end surfaces 160 and 161, and two side surfaces 170 and 171.

Figure 4:
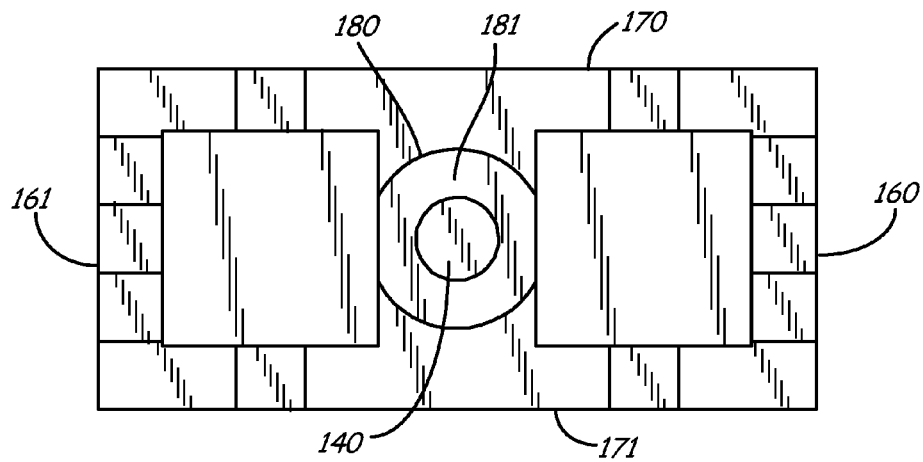
FIG. 4 is a bottom plan view of the component illustrated in FIG. 3.
Figure 5:
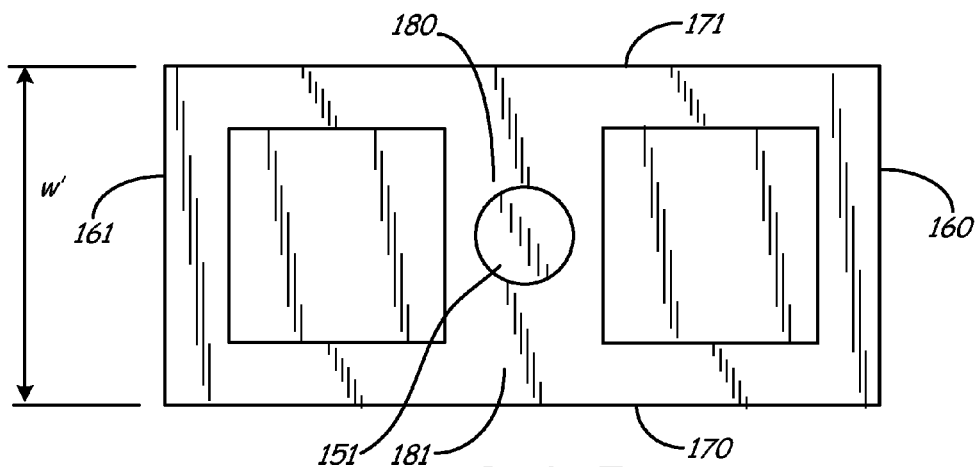
FIG. 5 is a top plan view of the component illustrated in FIGS. 3 and 4.

Referring to FIGS. 4 and 5, a middle portion 180 of the first lift component body 110 is disposed between the two sides (170 and 171) and two ends (160 and 161). The middle portion 180 may be formed as a member that is partially open containing a single stiffening rib 181. The middle portion 180 may optionally be formed as a solid region without ribs or more than one stiffening rib. Such alternative configurations may increase the load bearing capacity of the suspension lift component 102 and may serve to reduce twisting or flexing by the first suspension lift component 102.

The exemplar first suspension lift component body 110 may preferably be made from milled aluminum. However, the invention anticipates the use of cast steel or other metals possessing similar strength characteristics. The invention also anticipates the use of non-metal materials that have suitable strength characteristics.

Referring to FIGS. 8-12, exemplar second suspension lift component 600 comprises a second body 601. The second exemplar suspension lift component body 601 is generally parallelpiped in shape with height "h", width "w", and length "l" dimensions. The invention, however, anticipates any geometric shape for second body 601 that satisfies the functional characteristics described herein. Such shapes include, but are not limited to, a cube, a cylinder, a truncated square pyramid, a truncated right pyramid and the like. Second body 601 is configured to coordinate with first body 110 of suspension kit 100.

Second exemplar body 601, comprises a receiving interlock top side 610, which includes a second interlocking pattern 612 of second recess 641 and second protrusions 630. Among second protrusions is a first raised central region 625 that is specifically configured to cooperatively engage with central void 141 of the first exemplar suspension lift component 100. Second interlocking pattern 612 is configured to cooperatively engage with first interlocking pattern 112, wherein first protrusions 130 of first interlocking pattern 112 cooperatively engage with second recesses 641 of second interlocking pattern 612. Likewise, second protrusions 630 of second interlocking pattern 612 of second body 601 cooperatively engage with first recesses 141 of first interlocking pattern 112 of first body 110. Bottom side 120 of first body 110 and top side 610 of second body 601 are therefore specifically configured to removably matingly engage with one another. For example, second recesses 641 may be slightly larger than first protrusions 130 so that first protrusions 130 may operably nest within second recesses 641 of top side 610, and first recesses 141 may be slightly larger than second protrusions 630 so that second protrusions 630 may operably nest within first recesses 141 of bottom side 120 of first body 110.

The illustrated second interlocking pattern 610 includes second protrusions 630 with substantially flat top surfaces 631, at least some of which are aligned with one another along a second surface plane 633. In the exemplar embodiment, second protrusions 630 have a height of about 0.5 in, with the "height" being measured in the convention measured by height h". However, such dimensions are not intended to limit the possible range of sizes of second protrusions 630. In particular, second protrusions 630 may be of any suitable height, width, and length that satisfies the performance characteristics of second body 601, including as an individually employed suspension lift component between leaf spring suspension 950 and axle housing mounting bracket 910, wherein second body 601 meet structural requirements for a vehicle suspension system. Second protrusions 630 themselves may be provided in any of a variety of configurations useful both for supporting second body 601 in interposition between leaf spring suspension 950 and axle housing mounting bracket 910, as well as for interlocking with first suspension lift component 102. As indicated above, second protrusions 630 may be configured and arranged to provide support to second body 601, and particularly to inhibit structural fatigue or failure when utilized as a suspension lift element between leaf spring suspension 950 and axle housing mounting bracket 910. Accordingly, such protrusions 630 desirably withstand a significant amount of force without permitting performance-limiting deformation or failure of second body 601. The upper surfaces 631 of second protrusions 630 aligned along second surface plane 633 constitute an upper platform 632 which selectively bears against respective first recesses 141 in first body 110 (when first and second bodies 110, 601 are used in combination) or against leaf spring suspension 950 (when second body 601 is utilized individually between leaf spring suspension 950 and leaf spring mounting bracket 910). To provide a desirable and stable contact zone, upper platform 632 preferably has a surface area of about 6 in$^2$. In the illustrated embodiment, upper platform 632 has a contact surface area that is about 50% of a total possible surface area along upper surface plane 633. In some embodiments, the surface area of upper surfaces 361 aligned along upper platform 632 may be at least about 25%, and more preferably at least about 40% of a total possible surface area along top surface plane 633.

Figure 13:
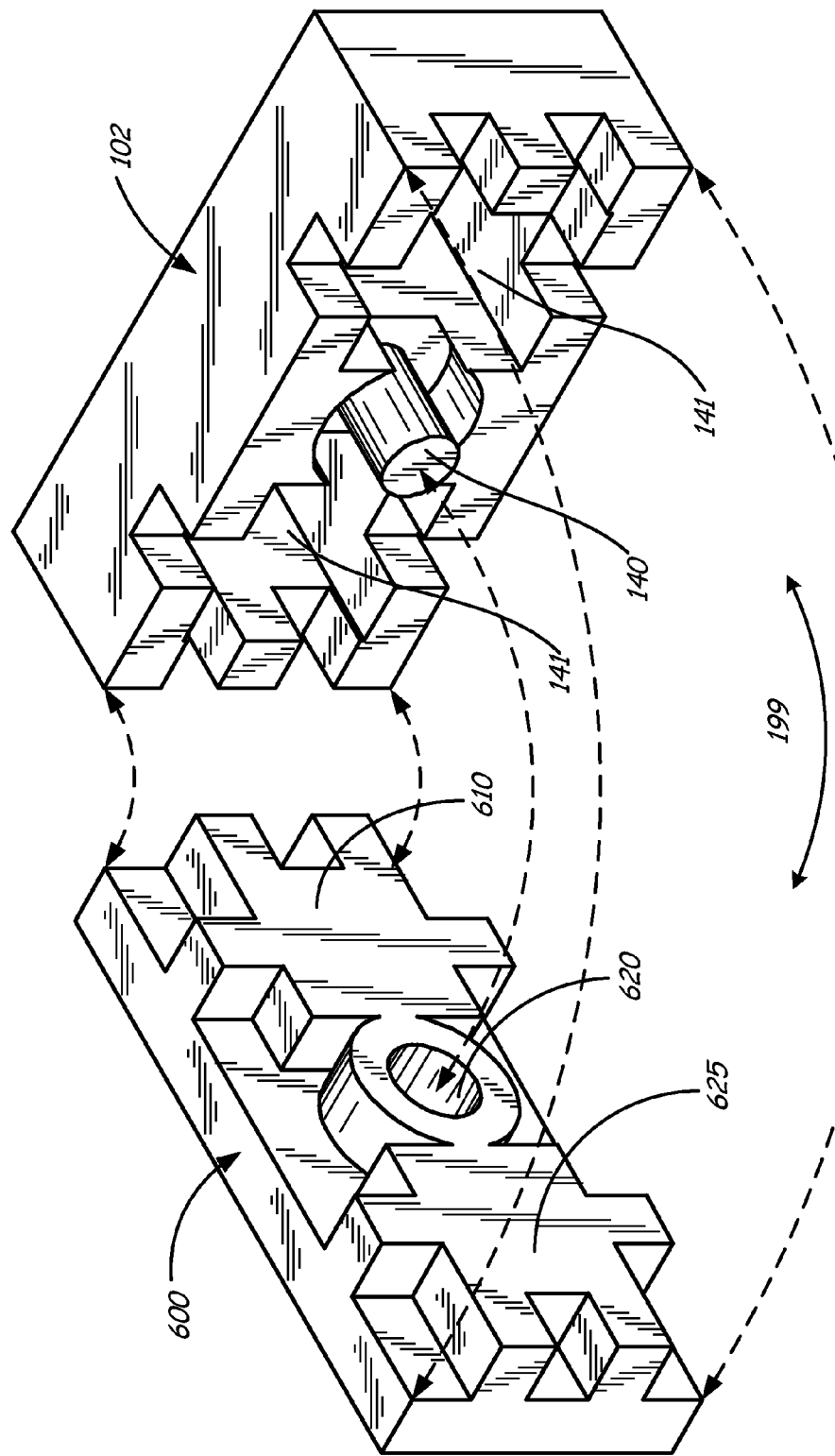
FIG. 13 is an exploded perspective view of the suspension lift kit illustrated in FIG. 1.

A further aspect of the present invention is embodied in the relative configurations of first and second interlocking patterns 112, 612. As described above, such interlocking patterns 112, 612 removably matingly engage with one another to interlock first and second bodies 110, 601. To effectively do so, however, each of first and second interlocking patterns 112, 612, when matingly engaged, desirably eliminate all but one degree of freedom of the combination. Specifically, first and second bodies 110, 601, when engaged, are movable only along a single disengagement direction 199, as illustrated in FIG. 13. The respective configurations of first and second interlocking patterns 112, 612 prevent relative movement among first and second bodies 110, 601 in any direction along interfacial plane 198.

Top side 610 of second body 601 further includes recess 620 for operably receiving a selected one of leaf spring positioning guide post 960 of vehicle leaf spring suspension 950, or first positioning guide post 140 of first body 110. Therefore, leaf spring guide post 960, or first positioning guide post 140, may connect with second lift component body 601 by engaging with recess 620 to align second body 601 therewith, and to inhibit undesired displacement of second body 601 when the assembly is complete. In the event that second body 601 is used individually in its capacity as second suspension lift component 600 between leaf spring suspension 950 and leaf spring mounting bracket 910, leaf spring positioning guide post 960 may be removably matingly engaged within recess 620 for alignment and securement purposes. Such an arrangement is illustrated in the exploded view of FIG. 15.

In the event that first suspension lift component 102 is employed in combination with second suspension lift component 600, first positioning guide post 140 of first body 110 may be operably and removably matingly engagable within recess 620 of second body 601. Such an arrangement is illustrated in the exploded schematic illustration of FIG. 2.

A central void 141 in bottom side 120 of first body 110 is adapted in shape and depth to engage a portion of first interlock top side 610 of second suspension lift component spacer 600 (see FIG. 13). It should be appreciated that while a specific configuration of central void 141 and receiving interlock side 610 is illustrated, any number of configurations may be used to allow for cooperative interlocking of first and second suspension lift components 102, 600. The cooperative interlocking of components 102, 600 is illustrated in FIG. 13. Second exemplar suspension lift component body 601 comprises a bottom side 635, which includes a second positioning guide post 640 extending outwardly from the bottom side 635 and beyond a bottom surface plane 637 (see FIGS. 11 and 12) so as to define an engaging protrusion for operably engaging within recess 920 of leaf spring mounting bracket 910 of the second suspension spacer body 601.

The second suspension spacer body 601 also comprises two end surfaces 760 and 761 and two side surfaces 770 and 771 (see FIGS. 7, 8, 9, and 10).

As described above, the vehicle axle housing 900 possesses a leaf spring mounting bracket 910 to facilitate attachment of the leaf spring suspension 950 to the axle housing 900. The leaf spring mounting bracket 910 is either welded to the axle housing 900 or is integral to the axle housing 900. The leaf spring mounting bracket 910 indicates a flat surface 912 upon which the leaf spring suspension 950 rests. Further, the mounting bracket possesses a recess 920 (not shown) for receiving a leaf spring guide post 960, or in the case of the present invention, one of first or second positioning guide posts 140, 640.

In some embodiments, the leaf spring guide post 960 is positioned at a lower tangent region of the leaf spring suspension 950, and may comprise a bolt head or nut associated with a bolt that holds the individual leaves of the spring suspension together and helps to maintain the leaf spring suspension 950 in proper position relative to the axle housing 900 when the components are secured in place. The leaf spring suspension 950 is secured to the axle housing 900 with multiple U-bolts 1000. The leaf spring 950 are then fastened to the vehicle frame through a series of bushings and bolts (not shown).

Figure 2:
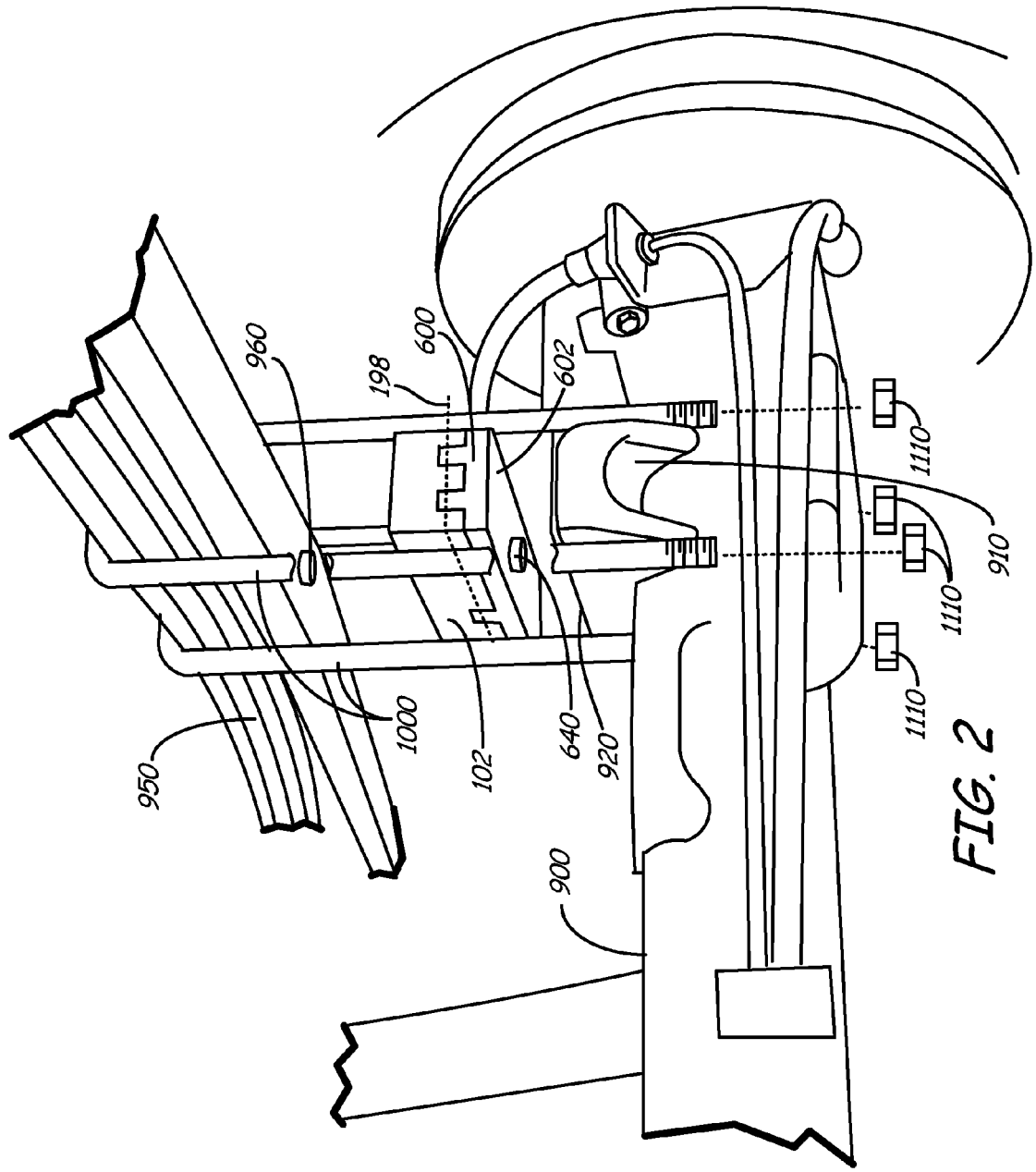
FIG. 2 is an exploded view of the schematic illustration of FIG. 1.
Figure 14:
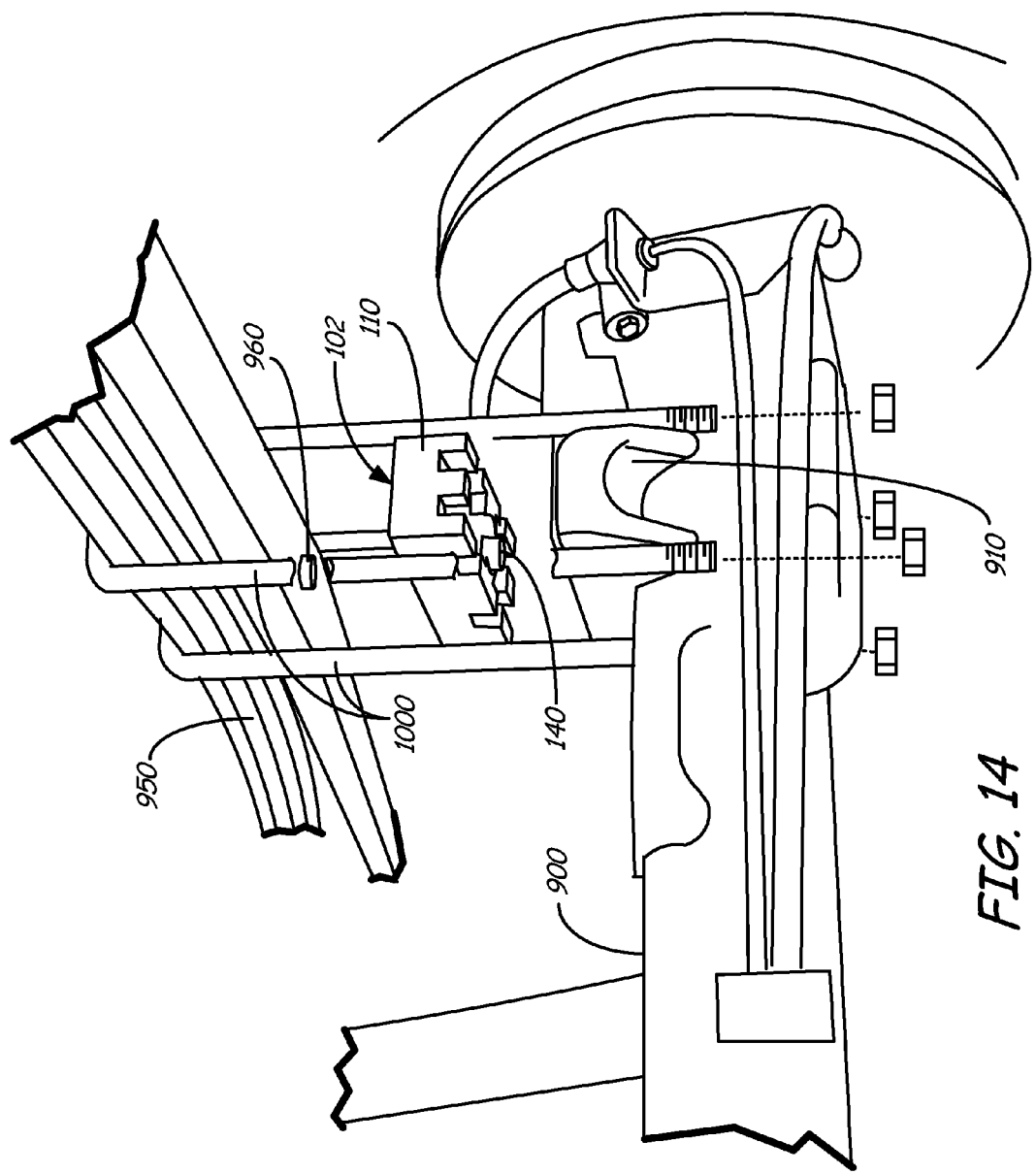
FIG. 14 is an exploded schematic illustration of the first component of the suspension lift kit in position between a vehicle leaf spring suspension and a vehicle wheel axle housing.
Figure 15:
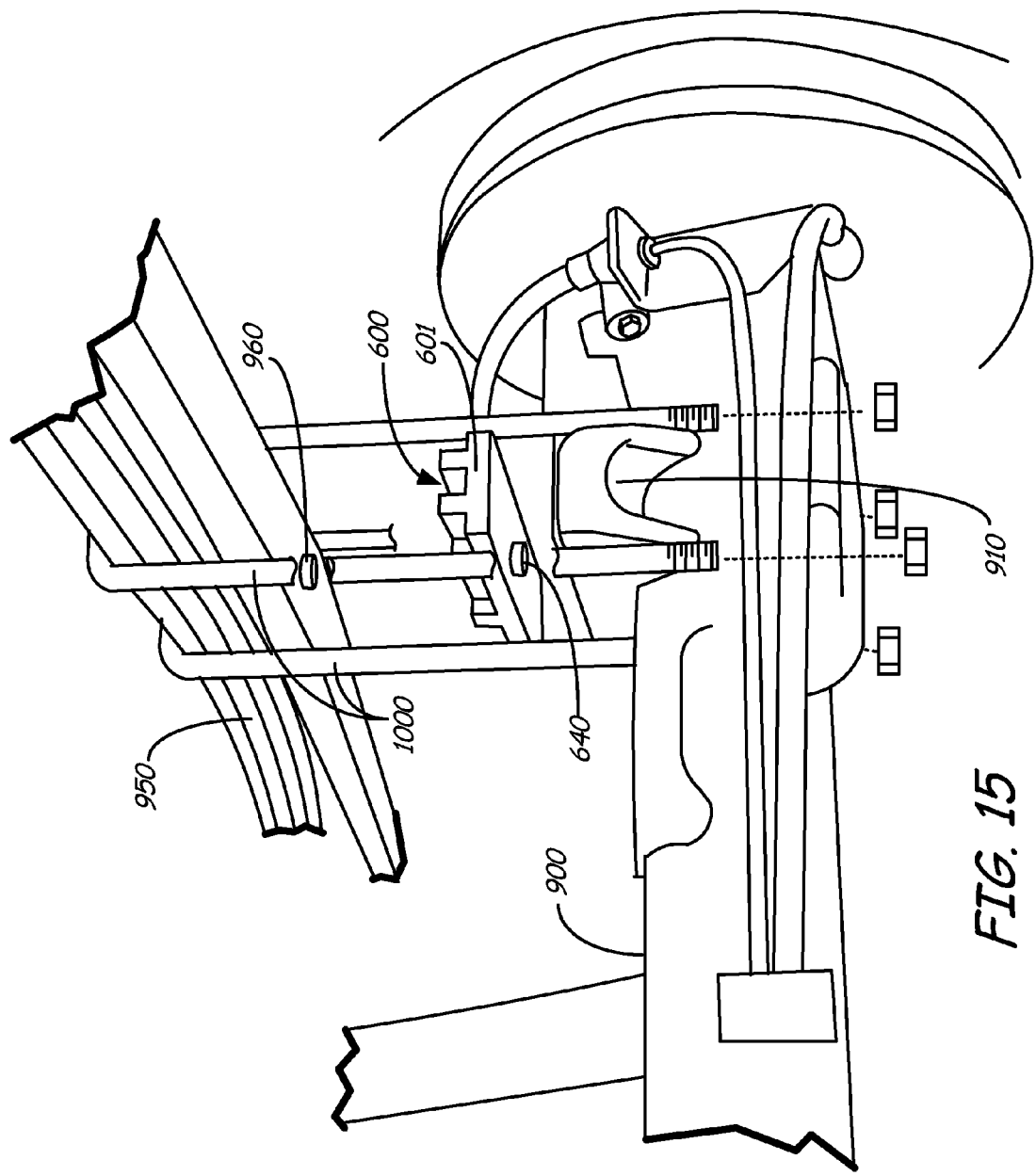
FIG. 15 is an exploded schematic illustration of the second component of the suspension lift kit in position between a vehicle leaf spring suspension and a vehicle wheel axle housing.

Installations of respective first and second lift suspension components 102, 600 individually are illustrated in FIGS. 14 and 15, respectively. Therefore, various possible approaches for effectuating a leaf spring suspension lift through the present suspension lift kit 100 is illustrated in FIGS. 1, 2, 14, and 15. In a particular example embodiment, first suspension lift component 102 has a height h' of about 2.5 in, and second suspension lift component 600 has a height dimension of h" of about 1.5 in. The individual application of first suspension lift component 102, as illustrated in FIG. 14, results in this particular embodiment in a suspension lift dimension of about 2.5 in, which corresponds to height dimension h' of first suspension lift component 102. The utilization of second suspension lift component 600 individually, as illustrated in FIG. 15, results in a suspension lift dimension for this particular embodiment of about 1.5 in, which corresponds to the height dimension h" of second suspension lift component 600. Application of both of first and second suspension lift components 102, 600 as illustrated in FIGS. 1 and 2, results in a suspension lift that is less than the sum of the height dimensions h', h" of first and second suspension lift components 102, 600. In this case, first and second interlocking patterns 112, 612 are operably interlocked, wherein first protrusions 130 are engaged with second recesses 641, and second protrusions 630 are engaged in first recesses 141 to accommodate the secure interlock, as described above. Therefore, the combined height dimension $H_1$ of first and second suspension lift components 102, 600 in this particular embodiment is about 2.5 in.

The interlock between first and second suspension lift components 102, 600 described above facilitates the use of a multi-component suspension lift kit for a plurality of distinct suspension lift dimensions. For example, United States governmental regulation through the National Transportation Safety Board (NTSB) prohibit the use of multiple stacked spacers in a suspension lift arrangement wherein such spacers resist relative movement only through frictional contact at their respective contact surfaces. As a result, those wishing to increase suspension height of a leaf spring suspension have previously needed to use a single block spacer with a height dimension that approximates the user's desired extent of suspension lift. If, however, the resultant lift is not to the satisfaction of the user, the spacer block has traditionally needed to be replaced with a completely separate block.

Through the unique arrangement of the interlocking components of the present suspension lift kit, installers may obtain a plurality of distinct lift dimensions with a single apparatus. The unique interlocking of the multiple lift components, which arrests displacement in any direction along interface plane 198, enables the installer to efficiently adjust suspension lift extent with a modular installation approach of one or more of the suspension lift components. It is contemplated, therefore, that installers may employ the suspension lift kit of the present invention to achieve a variety of customizable suspension lift dimensions.

It is to be understood that the components of suspension lift kit 100 described herein may preferably be fabricated from durable and strong materials for best performance. Overall, the invention has been described herein in considerable detail in order to comply with the patent statutes, and to provide these skilled in the art with the information needed to apply the novel principles and to construct and use embodiments of the invention as required. However, it is to be understood that various modifications can be accomplished without departing from the scope of the invention itself.

What is claimed is claimed is:
1. A vehicular suspension lift kit, comprising:
 a first component having first and second generally opposed sides, said first side including a first receptacle in a first outer surface and said second side including a first guide post that is of a configuration suitable for mating engagement within said first receptacle, and a first interlocking pattern having first protrusions and first recesses, said first protrusions including respective first protrusion outer surfaces that are co-planar with a first outer plane of said second side, wherein a first height of said first component is defined between said first outer plane and said first outer surface of said first side;
 a second component having first and second generally opposed sides, said first side including a second receptacle that is sized to matingly receive said first guide post of said first component, and a second interlocking pattern having second protrusions and second recesses, said second protrusions including respective second protrusion outer surfaces that are co-planar with a second outer plane of said first side of said second component, a second height of said second component being defined between said second outer plane and said second side of said second component, wherein said second interlocking pattern is matingly engagable with said first interlocking pattern to prevent relative motion among said first and second components along an interfacial plane parallel to said first and second outer planes, and a guide post that is of a configuration suitable for mating engagement within said first receptacle, wherein a third height is defined between said second side of said second component and said first outer surface of said second side of said first component when said first and second interlocking patterns are matingly engaged with one another, a sum of said first and second heights being greater than said third height.

2. A vehicular suspension lift kit as in claim 1 wherein said first height is greater than said second height.

3. A vehicular suspension lift kit as in claim 1 wherein said first guide post extends outwardly beyond said first outer plane of said second side of said first component.

4. A vehicular suspension lift kit as in claim 1 wherein said second guide post extends outwardly beyond an outer surface of said second side of said second component.

5. A method for adjusting suspension height of a vehicular leaf spring suspension, said method comprising:
   (a) providing a suspension lift kit having:
      (i) a first component having first and second generally opposed sides, said first side including a first receptacle in said first outer surface, and said second side including a first interlocking pattern having first protrusions and first recesses, said first protrusions including respective first protrusion outer surfaces that are co-planar with a first outer plane of said second side, said second side including a first guide post extending outwardly beyond said first outer plane, and a first height of said first component being defined between said first outer plane and said first outer surface of said first side; and
      (ii) a second component having first and second generally opposed sides, said first side including a second receptacle and a second interlocking pattern having second protrusions and second recesses, said second protrusions including respective second protrusion outer surfaces that are co-planar with a second outer plane of said first side of said second component, a second height of said second component being defined between said second outer plane and said second side of said second component, wherein said second interlocking pattern is matingly engagable with said first interlocking pattern to prevent relative motion among said first and second components along an interfacial plane parallel to said first and second outer planes, and a second guide post extending outwardly beyond an outer surface of said second side;
   (b) securing at least one of said first and second components between said vehicular leaf spring suspension and a vehicular axle housing, with a leaf spring guide post of said vehicular leaf spring suspension matingly engaging within a respective one of said first and second receptacles, and a respective one of said first and second guide posts matingly engaging within a housing receptacle within said vehicular axle housing.

6. A method as in claim 5, including securing both of said first and second components between said vehicular leaf spring suspension and a vehicular axle housing, with said first interlocking pattern of said first component being matingly engaged with said second interlocking pattern of said second component.

* * * * *

UNITED STATES PATENT AND TRADEMARK OFFICE
CERTIFICATE OF CORRECTION

| | | |
|---|---|---|
| PATENT NO. | : 8,317,211 B1 | |
| APPLICATION NO. | : 13/222771 | |
| DATED | : November 27, 2012 | |
| INVENTOR(S) | : Ryshavy et al. | |

It is certified that error appears in the above-identified patent and that said Letters Patent is hereby corrected as shown below:

Column 2, line 40, replace "different that" with --different than--; and

Column 6, line 31, replace "361" with --631--.

Signed and Sealed this
Twenty-ninth Day of January, 2013

David J. Kappos
*Director of the United States Patent and Trademark Office*